*Analysis.*—Calculated for $C_{18}H_{15}NO_2$ (percent): C, 77.96; H, 5.45; N, 5.05. Found (percent): C, 77.52; H, 5.44; N, 4.98.

The M.P. in the mixture with pure product, obtained by another way, is not lowered; the $R_f$, the IR and NMR spectra are also identical.

EXAMPLE 2

(a) 3,3',5,5'-tetrachloro-4,4'-dioxy-diphenyl-(2-pyridyl)-methane 13 ml. of concentrated sulphuric acid are added, during 15 minutes to a homogeneous mixture of 19.04 g. (0.1168 mole) of 2,6-dichlorophenol and 5 g. (0.0467 mole) of 2-pyridinaldehyde, the temperature being maintained between 0 and 5° C. The mixture is stirred at this temperature for half an hour and the temperature is then allowed to rise up to 30° C. The mixture is stirred for an additional 2 hours, heated for one hour at 50° C. and maintained for one hour at room temperature. The reaction mixture is then neutralized with 330 ml. of an 8.5% aqueous solution of sodium carbonate with external cooling and stirred for about one hour. A product separates which is filtered, washed, dried, triturated with ether and dried again. It weighes 16.7 g.; yield 86%.

The 3,3',5,5' - tetrachloro - 4,4' - dioxy - diphenyl-(2-pyridyl)-methane is a white solid crystallizing from 95° alcohol; M.P. 231–232° C.

*Analysis.*—Calculated for $C_{18}H_{11}Cl_4NO_2$ (percent): C, 52.08; H, 2.67; N, 3.38; Cl, 34.17. Found (percent): C, 51.58; H, 2.72; N, 3.31; Cl, 33.99.

(b) 4,4'-dioxy-diphenyl-(2-pyridyl)-methane 50 g. of 3,3',5,5' - tetrachloro - 4,4' - dioxy - diphenyl-(2-pyridyl)-methane are dissolved in 330 ml. of 10% sodium hydroxide and 49 g. of Nichel-Raney alloy are added to the solution with vigorous stirring. By proceeding as described in Example 1(b), the 4,4'-dioxy-diphenyl-(2-pyridyl)-methane is obtained (yields of 80%). The yields in respect to the 2-pyridinaldehyde are 69%.

EXAMPLE 3

By starting from 25.6 g. (0.1105 mole) of 2-bromophenol, 9 ml. of concentrated sulphuric acid, 4.75 g. (0.0442 mole) of 2-pyridinaldehyde and proceeding as described in the Example 1(a), 17.1 g. of crude product are obtained. The isomer 3,3' - dibromo - 2,4' - dioxy-diphenyl-(2-pyridyl)-methane in the crude product, is eliminated by thoroughly washing with 35 ml. of 95° boiling alcohol, thus obtaining 13.5 g. of isomer-free 3,3'-dibromo-4,4'-dioxy-diphenyl-(2 - pyridyl) - methane (yield 70%). White solid, crystallizing from 95° alcohol; M.P. 173–175° C.

*Analysis.*—Calculated for $C_{18}H_{13}Br_2NO_2$ (percent): C, 49.70; H, 3.02; N, 3.22; Br, 36.72. Found (percent): C, 49.88; H, 3.11; N, 3.9; Br, 35.60.

EXAMPLE 4

14.68 g. (0.0858 mole) of 2-pyridinaldehyde are added during 1 hour and at a temperature ranging from 0 to 5° C., to a suspension of 54 g. (0.2145 mole) of 2,6-dibromo-phenol in 37 ml. of concentrated sulphuric acid. By proceeding as described in Example 2(a), 44.8 g. of 3,3',5,5'-tetrabromo-4,4' - dioxy - diphenyl - (2 - pyridyl)-methane are obtained (yield 88%). White solid crystallizing from 95° alcohol; M.P. 223.5–225° C.

*Analysis.*—Calculated for $C_{18}H_{11}Br_4NO_2$ (percent): C, 36.45; H, 1.86; N, 2.36; Br, 53.90. Found (percent): C, 36.57; H, 1.91; N, 2.30; Br, 53.51.

EXAMPLE 5

(a) Disodium 3,3-dichloro-4,4'-disulphoxy-diphenyl-(2-pyridyl)-methane 5.05 g. (0.0433 mole) of chlorosulphonic acid are dropped during 10 minutes to a solution of 5 g. (0.0144 mole) of 3,3'-dichloro-4,4'-dioxy-diphenyl-(2-pyridyl)-methane in 35 ml. of anhydrous pyridine, the temperature being maintained at 0–5° C. by external cooling. A brown precipitate is thus obtained. The mixture is gently heated for 7 hours at 45–50° C. with stirring, then it is allowed to stand overnight at room temperature. The solution obtained is poured into 140 ml. of water/ice containing 20 ml. of 30% sodium hydroxide. The final pH of the solution is >9. The solution is washed with ether, filtered with charcoal, brought to pH 7 with 15% hydrochloric acid, washed with chloroform, adjusted to pH 7.5 and at last concentrated to dryness under reduced pressure. The solid residue obtained is finely crushed with ether, dried and taken up with 200 ml. of boiling anhydrous alcohol. After filtration of the insoluble portion, the alcoholic solution is filtered with charcoal and evaporated under reduced pressure thus obtaining 7.2 g. of product (yield 90%). The product may be used for the subsequent reaction without further purification.

The crude product may be purified by redissolving in anhydrous alcohol, filtering with charcoal, precipitating with chloroform, decanting the solvent, washing the viscous product obtained with fresh chloroform and at last triturating with anhydrous ether. The product is an ivory-white solid, M.P. 248.5–251° C. dec.

*Analysis.*—Calculated for $C_{18}H_{11}O_8Cl_2NS_2Na_2$ (with 4.1% of $H_2O$) (percent): C, 37.64; H, 2.38; N, 2.48; S, 11.18; Na, 8.02; Cl, 12.37. Found (percent): C, 37.11; H, 2.42; N, 2.46; S, 10.95; Na, 8.11; Cl, 12.21.

(b) Disodium 4,4'-disulphoxy-diphenyl-(2-pyridyl)-methane 3.7 g. of Nichel-Raney alloy are added, during 4 hours, to a solution of 10 g. (0.0182 mole) of crude disodium 3,3' - dichloro - 4,4' - disulphoxy - diphenyl - (2 - pyridyl)-methane in 75 ml. of 5% sodium hydroxide, with vigorous stirring and at room temperature. The mixture is then stirred overnight at room temperature and the undissolved portion is filtered off. The solution, filtered with charcoal, is brought to pH 7.5 with 10% hydrochloric acid, filtered again and at last evaporated to dryness with a thin layer concentrator.

The dry residue so obtained, is taken up with about 150 ml. of boiling anhydrous alcohol and the alcoholic solution is concentrated till incipient crystallization.

The disodium 4,4'-disulphoxy - diphenyl - (2 - pyridyl)-methane is obtained as a white crystalline solid, M.P. 272–275° dec. (yield 68%).

*Analysis.*—Calculated for $C_{18}H_{13}O_8NS_2Na_2$ (with 6.5% of $H_2O$) (percent): C, 41.97; H, 3.26; N, 2.71; S, 12.44; Na, 8.93. Found (percent): C, 42.31; H, 3.21; N, 2.76; S, 11.90, Na, 8.92.

EXAMPLE 6

(a) Disodium 3,3'-dibromo-4,4'-disulphoxy-diphenyl-(2-pyridyl)-methane

By starting from 5 g. (0.01154 mole) of 3,3'-dibromo-4,4'-dioxy-diphenyl-(2-pyridyl)-methane, 35 ml. of anhydrous pyridine, 4.04 g. (0.0346 mole) of chlorosulphonic acid and by proceeding as described in Example 5(a), 5.5 g. of crude product (yield 74%) are obtained. The product may be purified as above described or by crystallization from anhydrous alcohol. The disodium 3,3'-dibromo-4,4'-disulphoxy-diphenyl-(2-pyridyl)-methane is a white crystalline solid, M.P. 239–240° C. dec.

*Analysis.*—Calculated for $C_{18}H_{11}O_8Br_2NS_2Na_2$ (with 3.78% of $H_2O$) (percent): C, 32.50; H, 2.09; N, 2.10; S, 9.64; Na, 6.92; Br, 24.03. Found (percent): C, 32.66; H, 2.17; N, 2.08; S, 9.51; Na, 6.94; Br, 24.31.

(b) Disodium 4,4'-disulphoxy-diphenyl-(2-pyridyl)-methane

By starting from 11.6 g. (0.0182 mole) of crude disodium 3,3'-dibromo-4,4'-disulphoxy - diphenyl - (2 - pyridyl)-methane, 75 ml. of 5% sodium hydroxide, 3.7 g. of Nichel-Raney alloy and proceeding as described in Example 5(b), the product is obtained in 70% yield.

EXAMPLE 7

(a) Disodium 3,3',5,5'-tetrachloro-4,4'-disulphoxy-diphenyl-(2-pyridyl)-methane 4.21 g. (0.0361 mole) of chlorosulphonic acid are added during 10 minutes to 5 g. (0.012 mole) of 3,3',5,5'-tetrachloro-4,4'-dioxy-diphenyl-(2 - pyridyl) - methane in 35 ml. of anhydrous pyridine, the temperature being maintained between 0 and 5° C. by external cooling. The mixture is heated for 7 hours at 75–80° C. and then worked up as described in Example 5(a).

The crude product is isolated by evaporation to dryness of the alcoholic solution (yield 41%) and it may be purified as described in Example 5(a). The disodium 3,3',5,5'-tetrachloro-4,4'-disulphoxy - diphenyl - (2-pyridyl)-methane is a pale yellow coloured solid, M.P. 212–220° C. dec.

*Analysis.*—Calculated for $C_{18}H_9O_8Cl_4NS_2Na_2$ (with 3.9% of $H_2O$ (percent): C, 33.54; H, 1.85; N, 2.17; S, 9.95; Na, 7.14; Cl, 22.02. Found (percent): C, 33.09; H, 1.94; N, 2.09; S, 9.73; Na, 7.08; Cl, 21.54.

(b) Disodium 4,4'-disulphoxy-diphenyl-(2-pyridyl)-methane

By starting from 11.26 g. (0.00182 mole) of crude disodium 3,3',5,5'-tetrachloro - 4,4' - disulphoxy-diphenyl-(2-pyridyl)-methane, 75 ml. of 5% sodium hydroxide, 3.7 g. of Nichel-Raney alloy and proceeding as described in Example 5(b), the product is obtained with yields of the 55%.

EXAMPLE 8

(a) Disodium 3,3',5,5'-tetrabromo-4,4'-disulphoxy-diphenyl-(2-pyridyl)-methane

By starting from 5 g. (0.00843 mole) of 3,3',5,5'-tetrabromo-4,4'-dioxy - diphenyl - (2-pyridyl)-methane, 35 ml. of anhydrous pyridine and 2.95 g. (0.0253 mole) of chlorosulphonic acid and proceeding as described in Example 7(a), the disodium 3,3',5,5'-tetrabromo-4,4'-disulphoxy-diphenyl - (2-pyridyl)-methane is obtained (yields in crude product 38%). The product is a yellow solid, M.P. 180–200° C. dec.

*Analysis.*—Calculated for $C_{18}H_9O_8Br_4NS_2Na_2$ (with 4.17% of $H_2O$) (percent): C, 26.00; H, 1.55; N, 1.69; S, 7.72; Na, 5.53; Br, 38.43. Found (percent): C, 25.88; H, 1.61; N, 1.64; S, 7.59; Na, 5.44; Br, 38.01.

(b) Disodium 4,4'-disulphoxy-diphenyl-(2-pyridyl)-methane

By starting from 14.5 g. (0.0182 mole) of crude disodium 3,3',5,5'-tetrabromo - 4,4' - disulphoxy-diphenyl-(2-pyridyl)-methane, 75 ml. of 5% sodium hydroxide, 3.7 g. of Nichel-Raney alloy and proceeding as described in Example 5(b), the product is obtained in 62% yields.

What is claimed is:

1. A compound of the general formula:

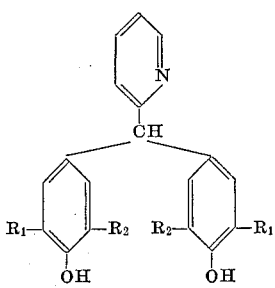

(II)

where $R_1$ and $R_2$ may be the same or different, represent a halogen or hydrogen atom and at least one of the substituents $R_1$ or $R_2$ is a halogen atom.

2. A compound as defined in claim 1 of the general formula:

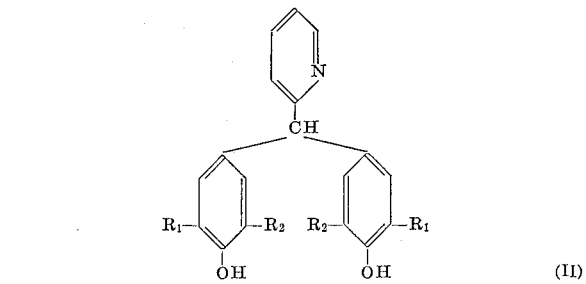

(II)

where $R_1$ and $R_2$ may be the same or different, represent chlorine or hydrogen atoms and at least one of the substituents $R_1$ or $R_2$ is chlorine.

3. A compound as defined in claim 1 of the general formula:

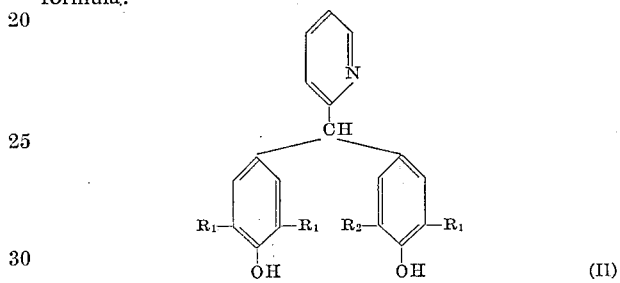

(II)

where $R_1$ and $R_2$ may be the same or different, represent bromine or hydrogen atoms, at least one of the substituents $R_1$ or $R_2$ is bromine.

4. T compound as defined in claim 1 having the formula:

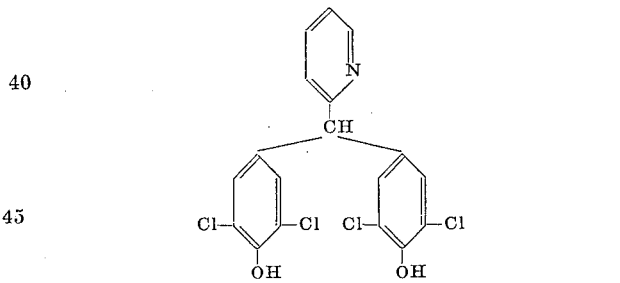

5. A compound as defined in claim 1 having the formula:

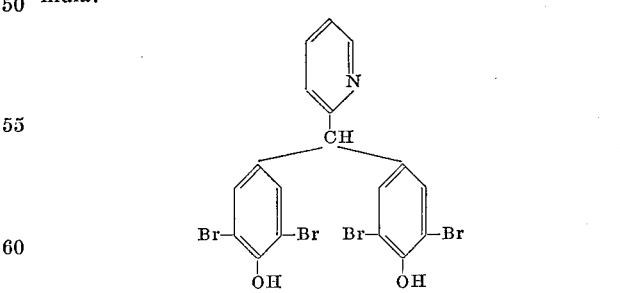

References Cited

UNITED STATES PATENTS

| | | | |
|---|---|---|---|
| 2,764,590 | 9/1956 | Kottler et al. | 260—295 |
| 2,727,895 | 12/1955 | Sperber et al. | 260—290 |

OTHER REFERENCES

Kammerer et al.: Chem. Abstracts, vol. 53, par. 1262–1263, 1959.

ALAN L. ROTMAN, Primary Examiner

U.S. Cl. X.R.

260—294.8, 295, 999

United States Patent Office 3,558,643
Patented Jan. 26, 1971

3,558,643
CERTAIN 4,4'-DIOXY-DIPHENYL-(2-PYRIDYL)-METHANES
Gianfranco Pala, Milan, Italy, assignor to Istituto de Angeli S.p.A., a corporation of Italy
No Drawing. Filed May 16, 1967, Ser. No. 638,755
Int. Cl. C07d 31/28
U.S. Cl. 260—297                           5 Claims

ABSTRACT OF THE DISCLOSURE

In a process for the preparation of 4,4'-dioxy-diphenyl-(2-pyridyl)-methane, the stage of condensation of a compound selected from 2-pyridinaldehyde and a reactive derivative thereof, in the presence of a condensing agent with a phenol of formula:

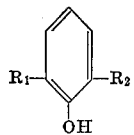

$$\text{(I)}$$

where $R_1$ and $R_2$ represent a halogen or hydrogen atom and at least one of the substituents $R_1$ or $R_2$ is a halogen atom—with formation of a compound of general formula:

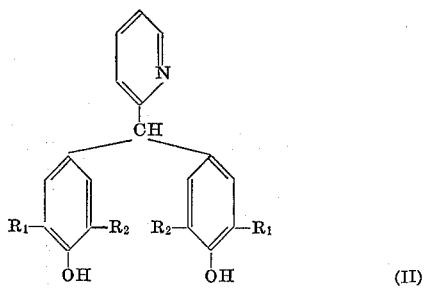

$$\text{(II)}$$

the groups $R_1$ and $R_2$ in each benzene ring being as above defined; and the stage of dehalogenation of the so obtained compound of Formula II by Nichel-Raney alloy in the presence of caustic alkalis.

---

This invention relates to a new and advantageous process for the preparation of 4,4'-dioxy-diphenyl-(2-pyridyl)-methane and salts of the corresponding sulphuric ester 4,4'-disulphoxy-diphenyl-(2 - pyridyl) - methane, already known compounds; the former may be used as an intermediate for the synthesis of compounds having a laxative activity, the latter as laxative drugs.

An already known method for the preparation of 4,4'-dioxy-diphenyl-(2-pyridyl)-methane consists in condensing 2-pyridinaldehyde or a reactive derivative thereof, with phenol in the presence of a condensing agent. It has, however, been found that, in addition to the desired compound, such method leads to the formation of an elevated percentage (24–29%) of the unwanted isomer 2,4'-dioxy-diphenyl-(2-pyridyl)-methane, the removal of which requires subsequent crystallizations from alcohol (at least two crystallizations).

The final yields of pure product are therefore rather modest. It is pointed out that the formation of the unwanted isomer depends on the fact that phenol can react, in addition to the 4-position, also in the 2 and 6 positions in ortho to the phenolic hydroxy group.

Furthermore in our U.S.A. patent application Ser. No. 573,873, a method for the preparation of salts of 4,4'-disulphoxy-diphenyl-(2-pyridyl)-methane by starting from 4,4'-dioxy-diphenyl-(2-pyridyl)-methane has already been described.

The process according to the invention allows the elimination or the substantial reduction of the formation of unwanted isomers, pure 4,4'-dioxy-diphenyl-(2-pyridyl)-methane and salts of the corresponding sulphuric ester are thus obtained in elevated yields.

Object of the present invention is a process for the preparation of 4,4' - dioxy - diphenyl-(2-pyridyl)-methane characterized in that 2-pyridinaldehyde or a reactive derivative thereof is condensed in the presence of a condensing agent, with a phenol of formula:

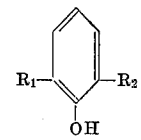

$$\text{(I)}$$

where $R_1$ and $R_2$ which may be the same or different, represent a halogen or a hydrogen atom and at least one of the groups $R_1$ and $R_2$ is a halogen atom, to give a compound of general formula:

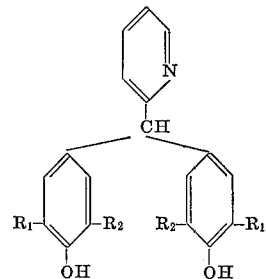

$$\text{(II)}$$

where $R_1$ and $R_2$ in each benzene ring are as above defined; and in that the halogen derivative of Formula II so obtained, is subsequently dehalogenated with Nichel-Raney alloy, in the presence of a caustic alkali.

A further object of the present invention consists in converting a compound of Formula II, as above defined, into a salt of the corresponding sulphuric ester of formula:

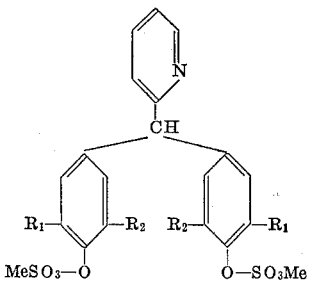

$$\text{(III)}$$

where $R_1$ and $R_2$ are as above defined and Me represents an inorganic cation—by reaction with chlorosulphonic acid ($HSO_3Cl$ or $SO_2(OH)$ Cl); the Compound III is subsequently dehalogenated with Nichel-Raney alloy, in the presence of a caustic alkali to give the salt of the 4,4'-disulphoxy-diphenyl-(2-pyridyl)-methane.

It is pointed out that the formation of unwanted isomers is completely prevented when phenols of Formula I are used, in which both $R_1$ and $R_2$ represent halogen atoms, in that the positions in ortho to the phenolic hydroxy group are substituted, whilst, when only one of these substituents is a halogen atom, such formation takes place but at a noticeably minor extent as compared with unsubstituted phenol, in that only one of the 2 and 6 positions can give rise to the side-reaction. In the latter case the reaction product, obtained with good yields, contains a little amount of the unwanted isomer which, however, can be easily eliminated by washing with boiling 95° alcohol.

In compounds of Formulae I, II and III, $R_1$ and/or $R_2$ when representing a halogen atom, are preferably a chlorine or bromine atom. Compounds of Formula I which may be advantageously used according to the invention comprise for instance 2-chloro, 2-bromo, 2,6-dichloro and 2,6-dibromo-phenol. In addition to the 2-pyridinaldehyde, its reactive derivatives may also be used, e.g., bisulphite addition derivatives and acetals. As condensing agents, acid condensing agents are used, e.g., sulphuric or phosphoric acid, zinc chloride, aluminium chloride. Sulphuric acid is preferably used.

According to a particularly advantageous manner for carrying out the process of the invention, 2-pyridinaldehyde is reacted with a phenol of Formula I, preferably 2-chloro, 2-bromo, 2,6-dichloro or 2,6-dibromo-phenol, in the presence of concentrated sulphuric acid. The phenol of Formula I is preferably used in excess, advantageously in the ratio comprised between 1:2.1 and 1:3.5.

For the practical performance of the process according to the invention, the phenol of Formula I is slowly added to a homogeneous suspension of 2-pyridinaldehyde in concentrated sulphuric acid, at a low temperature, advantageously at a temperature ranging between 0 and 5° C. The reaction mixture is maintained at this temperature with stirring for ½–2 hours, the temperature is then allowed to rise spontaneously up to 30° C. and the stirring is continued for ½–2 hours. The reaction is at least completed by stirring overnight at room temperature. When the phenol of Formula I used for the reaction is a 2,6-dihalogen-substituted phenol, the sulphuric acid is preferably added to the mixture of the other two reagents, the reaction is then advantageously completed by moderate heating, preferably at 50° C. for 1 hour and allowing to stand at room temperature for an additional hour.

The compound of Formula II, obtained as above described, is isolated from the reaction mixture by dissolving the mass with an excess of 10% sodium hydroxide followed by precipitation of the compound by addition of 5% hydrochloric acid till neutrality or, alternatively by direct neutralization of the reaction mixture with a solution of sodium hydroxide or sodium carbonate. The solid product so obtained is filtered, washed with water, dried, thoroughly washed with ether and dried. Compounds of Formula II, where $R_1$ (or $R_2$)=H and $R_2$ (or $R_1$)=halogen, after washing with ether, are also washed with 95° boiling alcohol to remove the unwanted isomer.

The compounds of Formula II are new compounds; they are white solids, insoluble in water and soluble in sodium hydroxide.

The compounds of Formula II so obtained, are subsequently dehalogenated in a 5% sodium hydroxide solution, by adding, at room temperature and during 3–5 hours, Nichel-Raney alloy and by stirring overnight at room temperature. After filtration, the 4,4'-dioxy-diphenyl-(2-pyridyl)-methane is precipitated from the alkaline solution by adding 10% acetic acid up to pH 5, filtered, washed with water, dried, redissolved into 95° alcohol; the mixture is filtered to remove the insoluble salts and the product is at last obtained by evaporation of the solvent.

If the salts of the corresponding sulphuric esters of Formula III are desired, a compound of Formula II is reacted under substantially anhydrous conditions, with chlorosulphonic acid in the presence of anhydrous pyridine. An excess of chlorosulphonic acid is advantageously dropped into a solution of a compound of Formula II in anhydrous pyridine kept at a temperature ranging between 0 and 5° C. The temperature is then gradually raised to 45–80° C. and the reaction mixture is maintained at this temperature with stirring for 7 hours and after keeping overnight at room temperature, slowly poured into a mixture of ice and sodium hydroxide, in such a way that the solution is alkaline to the phenolphthalein. The alkaline solution is then washed with ether, filtered with charcoal, brought up to pH 7 with 10% hydrochloric acid, washed with chloroform and after further adjusting the pH up to 7.5 with diluted sodium hydroxide, concentrated to dryness under reduced pressure.

The residue obtained is washed with ether and taken up with boiling anhydrous alcohol; the product undissolved is separated by filtration and the alcoholic solution evaporated to dryness. The crude product, obtained by evaporation of the solvent, may be advantageously used for the subsequent dehalogenation without further purification. If desired, the product may be purified by redissolving in anhydrous alcohol, by filtering with charcoal, by precipitating with chloroform and at last by washing with anhydrous ether. It is pointed out that the compounds of Formula III are new compounds.

The halogeno-substituted sulphuric ester so obtained, advantageously crude or, if desired, purified as above specified, is dehalogenated in 5% sodium hydroxide solution, with Nichel-Raney alloy as described for the compound of Formula II, thus obtaining the 4,4'-disulphoxy-diphenyl-(2-pyridyl)-methane disodium salt, which may be isolated from the alkaline solution by addition of 10% HCl up to pH 7.5, filtration and evaporation to dryness under reduced pressure, preferably with a thin layer concentrator; the dry residue is taken up with anhydrous alcohol to remove the insoluble salts, the alcoholic solution is filtered and concentrated till incipient crystallization of the product is reached.

The following examples are given by way of illustration only.

EXAMPLE 1

(a) 3,3'-dichloro-4,4'-dioxy-diphenyl-(2-pyridyl)-methane 75 g. (0.7 mole) of 2-pyridinaldehyde are dropped during about 1 hour to a homogeneous mixture (obtained between 0 and 10° C. from 107 ml. of concentrated sulphuric acid and 292.9 g. (2.28 moles) of 2-chlorophenol), maintaining the temperature between 0 and 5° C. The mixture is stirred for half an hour at this temperature, which is then allowed to rise spontaneously, having care not to exceed 30° C. After stirring for 1½ hours, the mixture is maintained overnight at room temperature, then it is dissolved, with external cooling, with a 10% sodium hydroxide solution, filtered with charcoal and neutralized with 5% hydrochloric acid. The precipitate obtained, consisting of crude product, filtered, washed with water, dried, triturated with ether and dried again, weighs 211 g.

The isomer 2,4'-dioxy-3,3'-dichloro-diphenyl-(2-pyridyl)-methane is removed by thoroughly washing with 430 ml. of 95° boiling alcohol, obtaining 167 g. of isomer-free product (yield 69%).

The 3,3'-dichloro-4,4'-dioxy-diphenyl-(2-pyridyl)-methane is a white solid, crystallizing from 95° alcohol; M.P. 212–215° C.

Analysis.—Calculated for $C_{18}H_{13}Cl_2NO_2$ (percent): C, 62.47; H, 3.78; N, 4.05; Cl, 20.48. Found (percent): C, 62.01; H, 3.80; N, 3.98; Cl, 20.27.

(b) 4,4'-dioxy-diphenyl-(2-pyridyl)-methane 100 g. of 3,3'-dichloro-4,4'-dioxy-diphenyl-(2-pyridyl)-methane, obtained as above described, are dissolved in 660 ml. of 10% sodium hydroxide and 49 g. of Nichel-Raney alloy are added to the solution with vigorous stirring, at room temperature and during 4 hours. The mixture is stirred overnight at soom temperature, then it is filtered and brought to pH=5 with 10% acetic acid. The precipitate obtained, filtered, washed and dried is then dissolved in 1500 ml. of 95° boiling alcohol to eliminate the insoluble salts. The residue obtained after the evaporation of the alcoholic solution weighs 74 g. (yield 92%). The yield in respect to 2-pyridinaldehyde is 63.5%.

The compound is a white solid, crystallizing from 95° alcohol; M.P. 248–250.5° C.

$R_f$ 0.361 (chromatography on thin layer; solvent cyclohexane/ethyl acetate/methanol in the ratio of 7:3:2; developer chromic mixture).

PO-1050
(5/69)

UNITED STATES PATENT OFFICE
CERTIFICATE OF CORRECTION

Patent No. 3,558,643          Dated January 26, 1971

Inventor(s) Gianfranco Pala

It is certified that error appears in the above-identified patent and that said Letters Patent are hereby corrected as shown below:

Column 4, line 62 "soom" should be -- room --;
Column 8, claim 3, the structural formula of the compound should be the same as in claim 1;
Column 8, claim 4, line 1, "T" should be -- A --.

Signed and sealed this 20th day of April 1971.

(SEAL)
Attest:

EDWARD M. FLETCHER, JR.           WILLIAM E. SCHUYLER, JR
Attesting Officer                 Commissioner of Patents